United States Patent Office 3,539,593
Patented Nov. 10, 1970

3,539,593
PHOTOCHROMIC COUMARIN COMPOUNDS
Kenneth Robert Huffman and Edwin Fisher Ullman, Stamford, Conn., assignors to American Cyanamid Company, Stamford, Conn., a corporation of Maine
No Drawing. Filed Oct. 24, 1966, Ser. No. 588,716
Int. Cl. C07d 7/28
U.S. Cl. 260—343.2      6 Claims

ABSTRACT OF THE DISCLOSURE

Photochromic 4-ethyl or higher alkyl or aralkyl-substituted 3-benzoylcoumarins are prepared by condensing a benzoylacetic acid ester with an ortho-hydroxy phenylalkyl or -aralkyl ketone in the presence of a metal or ammonium salt of an organic carboxylic acid.

This invention relates to photochromic coumarin compounds of the formula

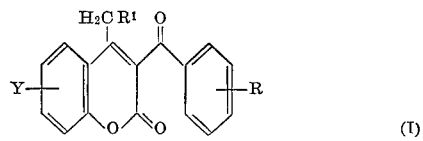

(I)

wherein Y and R are hydrogen, alkyl, phenyl, alkyl-substituted phenyl, hydroxy, alkoxy, alkylthio, acyloxy, cyano, nitro, amino, halogen, or trifluoromethyl; and $R^1$ is alkyl, aryl, or substituted aryl wherein the substituents for aryl are alkyl, hydroxy, alkoxy, alkylthio, cyano, nitro, amino, halogen or trifluoromethyl.

Alkyl in alkyl, alkoxy, alkylthio, alone or in substituted phenyl or substituted aryl, of Formula I above may contain from one to about eighteen carbon atoms inclusive, but preferably is lower alkyl ($C_1$–$C_8$). Acyloxy includes

wherein $R^2$ is aliphatic (e.g., $C_1$–$C_8$), aromatic (e.g., phenyl or naphthyl) or hydrogen. Amino includes —$NH_2$, monoalkylamino or dialkylamino wherein alkyl is preferably lower alkyl ($C_1$–$C_8$). Halogen includes chloro, bromo, iodo and fluoro. From the definition of Y, R and $R^1$ it will be noted that the substituents may each be different or, in some cases, two or all three may be the same. The foregoing description is but typical of the many substituents effective as Y, R, $R^1$ and $R^2$, it being understood that other substituents which do not inhibit the photochromic character of the compound will also be suitable.

These compounds are conveniently prepared by condensation of an appropriately substituted o-hydroxy-acetophenone with an aroylacetic ester in the presence of catalytic amounts of a mild base as follows, where $R^3$ is lower alkyl ($C_1$–$C_8$):

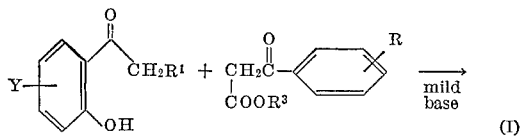

(I)

Amounts of reactants, reaction temperature, and order of addition are not critical and the procedures may be batch, continuous or semi-continuous. Thus, substantially molecular equivalent amounts of the reactants are generally employed although an excess of either reactant is also effective. Reaction temperatures may range from about 100° C. to about 300° C. depending, of course, on the reaction medium (if other than the reactants alone), the pressure at which the reaction is made to take place (generally atmospheric but also sub- or super-atmospheric), and other variants apparent to one skilled in the art. Reaction occurs readily and as carried to completion in a few minutes up to several hours, e.g., 2–10 hours, without other ingredients although inert organic solvents, such as diglyme, diphenyl ether, Tetralin, and the like, may be employed if desired. An inert atmosphere such as of nitrogen is generally provided for the reaction.

Besides the choice of reactants, the process differs essentially from known processes in the use of catalytic amounts (e.g., 0.001% to 5.0% by weight based on total weight of reactants) of a mild base such as an ammonium or alkali metal salt of an organic carboxylic acid, a trialkylamine, or the like. Typical basic salts are sodium acetate and sodium benzoate. Typical amines are tri(lower alkyl) amines such as triethylamine and tributylamine. In a known process, D. Molho and J. Brun, Bull. Soc. Chim. France [5] 29, 1741 (1962), the use of such catalysts is said to be ineffective. Moreover, the 3-benzoyl-4-methylcoumarin therein prepared is not photochromic.

The compounds of the invention exhibit photochromism, usually by ultraviolet irradiation, and are therefore useful in the manufacture of articles such as sunglasses, novelty toys, jewelry, and variable light transmission devices such as windows, photocopying machines and materials, optical masks, and the like.

Photochromic films, moldings or coatings, containing compounds of the invention in solution or as dispersed solids are particularly useful embodiments. Typical films are prepared by dissolving the compound in a suitable solvent such as benzene and adding this solution to a thermoplastic polymer solution. A representative composition is a 20% by weight solids mixture containing polymethylmethacrylate and photochromic compound (95% polymer to 5% photochromic compound). The composition is then spread on a suitable substrate such as polyester film and the solvent evaporated. The resulting article is useful as an optical mask, memory tape or sunvisor.

The following examples further illustrate the invention but are not limitative thereof except as indicated in the appended claims. All parts and percentages are by weight unless otherwise specified.

EXAMPLE 1

3-benzoyl-4-benzylcoumarin

A mixture of 1.87 grams of o-hydroxy-w-phenylacetophenone, 1.70 grams of ethyl benzoylacetate, and 50 milligrams of sodium acetate was fused at 225° C. for 3 hours under nitrogen. The mixture was then cooled and taken up in ether and washed several times with 5% aqueous sodium hydroxide. The dried ether solution was diluted with petroleum ether and concentrated on a steam bath. The product crystallized after several hours, melting point 122.5–126.5° C. Yield was 0.91 gram (30%). One recrystallization from ethanol gave faintly yellow crystals, melting point 127.5–128.5° C.

Analysis.—Calc'd for $C_{23}H_{16}O_3$ (percent): C, 81.16; H, 4.74. Found (percent): C, 81.01; H, 4.97.

EXAMPLE 2

3-benzoyl-4-ethylcoumarin

The above procedure was repeated in all essential respects but using 10.0 grams of o-hydroxypropiophenone, 10.0 grams of ethyl benzoylacetate and 0.50 gram of sodium acetate. This resulted in 4.15 grams (28% yield) of 3-benzoyl-4-ethylcoumarin, melting point 108.5–112.5° C.

Two recrystallizations from ethanol gave colorless prisms, melting point 113–114° C.

*Analysis.*—Calc'd for $C_{18}H_{14}O_3$ (percent): C, 77.68; H, 5.07. Found (percent): C, 77.54; H, 5.20.

EXAMPLES 3–21

Table I below illustrates other compounds of the invention which are prepared substantially as described in Examples 1 and 2. $R^3$ in the arolyacetic ester reactant is lower alkyl ($C_1$–$C_8$), e.g., methyl or ethyl.

TABLE I

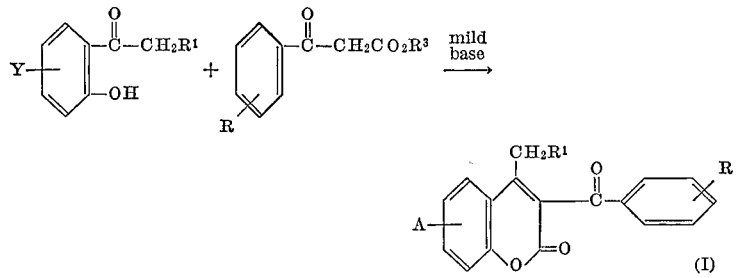

| | Y | $R^1$ | R |
|---|---|---|---|
| Example: | | | |
| 3 | 3-ethyl | methyl | p-ethyl |
| 4 | 4-phenyl | phenyl | p-hydroxy |
| 5 | hydrogen | p-tolyl | o-methoxy |
| 6 | 5-(p-tolyl) | m-nitrophenyl | p-diethylamino |
| 7 | 4-hydroxy | n-propyl | m-nitro |
| 8 | 6-ethoxy | o-ethoxyphenyl | hydrogen |
| 9 | 6-benzoyloxy | p-hydroxyphenyl | hydrogen |
| 10 | 4-methylthio | methyl | p-trifluoromethyl |
| 11 | hydrogen | phenyl | p-ethylthio |
| 12 | hydrogen | p-dimethylamino-phenyl | p-cyano |
| 13 | 4-dimethylamino | o-chlorophenyl | hydrogen |
| 14 | 5-cyano | m-bromophenyl | m-ethyl |
| 15 | hydrogen | p-cyanophenyl | o-fluoro |
| 16 | 5-nitro | ethyl | hydrogen |
| 17 | 3-trifluoromethyl | p-methylthio-phenyl | hydrogen |
| 18 | 6-chloro | phenyl | o-chloro |
| 19 | hydrogen | p-trifluoromethyl-phenyl | p-bromo |
| 20 | 4-bromo | i-propyl | hydrogen |
| 21 | hydrogen | n-undecyl | hydrogen |

We claim:
1. A photochromic compound of the formula

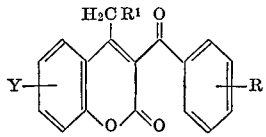

wherein Y and R are hydrogen, alkyl of 1–18 carbon atoms, phenyl, alkyl-substituted phenyl in which alkyl contains 1–18 carbon atoms, alkyloxy in which alkyl contains 1–18 carbon atoms, alkylthio in which alkyl contains 1–18 carbon atoms, $R^2CO.O-$ wherein $R^2$ is phenyl, naphthyl, hydrogen or aliphatic of 1–8 carbon atoms, cyano, nitro, amino, halogen or trifluoromethyl; and $R^1$ is alkyl of 1–18 carbon atoms, phenyl or substituted phenyl wherein the substituents for aryl are alkyl of 1–18 carbon atoms, hydroxy, alkyloxy in which alkyl contains 1–18 carbon atoms, alkylthio in which alkyl contains 1–18 carbon atoms, cyano, nitro, amino, halogen, or trifluoromethyl.

2. The compound of claim 1 wherein Y and R are hydrogen and $R^1$ is phenyl.

3. The compound of claim 1 wherein Y and R are hydrogen and $R^1$ is methyl.

4. The compound of claim 1 wherein Y is 5-(p-tolyl), R is p-diethylamino, and $R^1$ is m-nitrophenyl.

5. The compound of claim 1 wherein Y is hydrogen, R is p-cyano, and $R^1$ is p-dimethylaminophenyl.

6. The compound of claim 1 wherein Y is hydrogen, R is o-fluoro, and $R^1$ is p-cyanophenyl.

References Cited

Kharasch et al., Grignard Reactions of Nonmetallic Substances, Prentice-Hall, New York (1954), pp. 49, 817, 1238 and 1239.

Merck Index 6th Ed. (1954), p. 1064.

Buu-Hoi, Chem. Abstracts, vol. 51 (1957), p. 16446.

Pandya et al., Chem. Abstracts, vol. 52 (1958), p. 7307.

Buu-Hoi, Chem. Abstracts, vol. 53 (1959), p. 10200.

Molho et al., Chem. Abstracts, vol. 58 (1963), pp. 5620–1.

Woods, Chem. Abstracts, vol. 63 (1965), p. 16296.

JAMES A. PATTEN, Primary Examiner

U.S. Cl. X.R.

106—288; 117—1.7; 252—300